(12) United States Patent
Kim

(10) Patent No.: US 6,359,984 B1
(45) Date of Patent: Mar. 19, 2002

(54) FLIP-UP TYPE OR FOLDER TYPE MOBILE TELEPHONE TERMINAL WHICH ENABLES USER TO ANSWER CALL WITHOUT OPENING FLIP OR FOLDER

(75) Inventor: Jong-Myung Kim, Kumi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/298,414

(22) Filed: Apr. 23, 1999

(30) Foreign Application Priority Data

Jul. 28, 1998 (KR) .............................................. 98-30331
Aug. 13, 1998 (KR) .............................................. 98-32858

(51) Int. Cl.$^7$ ................................................ H04M 1/00
(52) U.S. Cl. .............................. 379/433.02; 379/433.13
(58) Field of Search ................................ 379/433, 428, 379/420, 433.02, 433.12, 433.13; 455/90, 575

(56) References Cited

U.S. PATENT DOCUMENTS 6,064,894 A * 5/2000 Zurek et al. ................. 455/575
6,104,808 A * 8/2000 Alameh et al. ............. 379/433
6,104,916 A * 8/2000 Steinhoff et al. ........... 379/433

* cited by examiner

Primary Examiner—Jack Chiang
(74) Attorney, Agent, or Firm—Dilworth & Barrese, LLP

(57) ABSTRACT

A flip-up type mobile telephone terminal enables a user to answer an incoming call even without opening a flip. A speaker unit includes first and second speakers installed at front and rear sides of the flip, respectively, facing the opposite directions. The speaker unit further includes a partition intervening between the first and second speakers to prevent interference therebetween. A flip-open sensor senses an open state of the flip. A controller detects the open state of the flip through the flip-open sensor, and switches a voice output path to the first speaker when the flip is closed and to the second speaker when the flip is open. A microphone device is installed in a bottom of the body.

7 Claims, 9 Drawing Sheets

FLIP-UP TYPE OR FOLDER TYPE MOBILE TELEPHONE TERMINAL WHICH ENABLES USER TO ANSWER CALL WITHOUT OPENING FLIP OR FOLDER

BACKGROUND OF THE INVENTION

1. Field of the Invention

The present invention relates to a mobile telephone terminal, and in particular, to a flip-up type or folder type mobile telephone terminal.

2. Description of the Related Art

Presently, a mobile telephone terminal may be characterized as being compact, lightweight and having high sensitivity. Further, the mobile telephone terminals may be classified into either bar type, flip type, and a folder type according to its shape. Among the three categories, the flip type and folder type mobile telephone terminals are most popular. The flip type and folder type mobile telephone terminals are advantageous in that the flip and folder for covering a body of the mobile telephone terminal prevents mis-pressing of buttons and also functions as a reflection plate for the voice during conversation. Moreover, it is possible to install a microphone or speaker on the flip or folder of the mobile telephone terminal, thereby contributing to miniaturization of the mobile telephone terminal.

A general flip type mobile telephone terminal is composed of a body, a flip and a hinge device for openably mechanically coupling the flip to the body. Here, the hinge device acts as an axle of the flip. This flip type mobile telephone terminal can be further categorized into a flip-down type and a flip-up type. The flip-down type mobile telephone terminal has an axle of the flip mounted on the lower end of the body, while the flip-up type mobile telephone terminal has the axle of the flip mounted on the upper end of the body. A general folder type mobile telephone terminal includes a body, a folder and a hinge device for mechanically coupling the folder to the body.

The flip-up type and folder type mobile telephone terminals, unlike the bar type and flip-down type mobile telephone terminals, have a speaker device installed in an inner side of the flip and the folder. Accordingly, when the flip or the folder is closed with respect to the body, the user cannot communicate with the other party using the speaker device unless he or she opens the flip or the folder. In particular, when the user holds something in his or her hands and receives an incoming call, he or she cannot easily open the flip or the folder to answer the incoming call.

Therefore, there is a need for a flip-up type or folder type mobile telephone terminal which enables the user to communicate with the other party without being required to open the flip or the folder.

SUMMARY OF THE INVENTION

The present invention has been accomplished to eliminate the aforesaid disadvantages and problems. It is therefore an object of the present invention to provide a flip-up type or folder type mobile telephone terminal which enables a user to answer an incoming call without opening a flip or a folder.

According to one aspect of the present invention, a flip-up type mobile telephone terminal includes a speaker unit which has first and second speakers installed at front and rear sides of a flip of the telephone terminal, respectively, facing the opposite directions. The speaker unit further has a partition intervening between the first and second speakers to prevent interference therebetween. A flip-open sensor senses an open state of the flip and a controller switches a voice output path to the first speaker when the flip is closed and to the second speaker when the flip is open. Further, a microphone device is installed in a bottom of the body of the telephone terminal.

According to another aspect of the present invention, a folder type mobile telephone terminal includes a speaker unit having first and second speakers installed at front and rear sides of a folder of the telephone terminal, respectively, facing opposite directions. The speaker unit further has a partition intervening between the first and second speakers to prevent interference therebetween. A folder-open sensor senses an open state of the folder, and a controller switches a voice output path to the first speaker when the folder is closed and to the second speaker when the folder is open.

According to still another aspect of the present invention, a flip-up type mobile telephone terminal includes a first speaker device installed in an inner side of a flip of the telephone terminal; a second speaker device installed in a front, upper portion of a body of the telephone terminal such that the second speaker device is not covered by the flip when the flip is closed; a flip-open sensor for sensing an open state of the flip; and a controller for detecting the open state of the flip through the flip-open sensor, and switching a voice output path to the second speaker device when the flip is closed and to the first speaker device when the flip is open. The flip-up type mobile telephone terminal further includes a microphone device installed in a bottom of the body.

According to still another aspect of the present invention, a folder type mobile telephone terminal includes a first speaker device installed in an inner side of a folder of the telephone terminal; a second speaker device installed in an outer, upper portion of the folder; a folder-open sensor for sensing an open state of the folder; and a controller for detecting the open state of the folder through the folder-open sensor, and switching a voice output path to the second speaker device when the folder is closed and to the first speaker device when the folder is open. The folder type mobile telephone terminal further includes a microphone device installed in a bottom of the body.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

Figure 1:
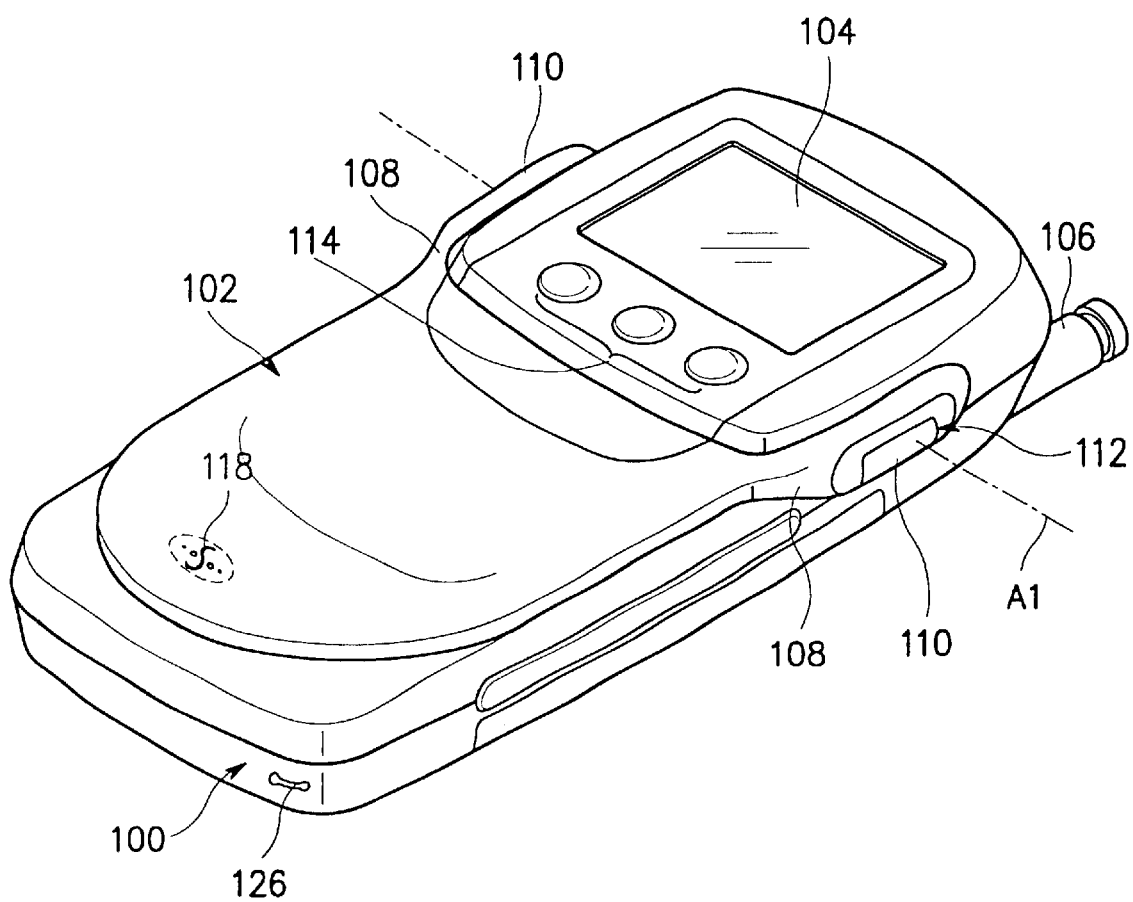
FIG. 1 is a perspective view of a flip-up type mobile telephone terminal with a flip closed, according to an embodiment of the present invention.

A preferred embodiment of the present invention will be described hereinbelow with reference to the accompanying drawings. In the following description, well known functions or constructions are not described in detail since they would obscure the invention in unnecessary detail.

The mobile telephone terminal will now be described in greater detail with reference to FIGS. 1 and 2. A flip-up type mobile telephone terminal according to an embodiment of the present invention is illustrated with a closed flip in FIG. 1. FIG. 2 illustrates the flip-up type mobile telephone terminal with an open flip. The mobile telephone terminal includes a body 100, a flip 102, and a hinge device 112 for mechanically coupling the flip 102 to the body 100. The hinge device 112 is mounted on either side of an LCD (Liquid Crystal Display) unit 104 for mechanically coupling the flip 102 to the body 100. A shaft of the hinge device 112 is secured to hinge knuckles 110 of the flip 102. Here, for convenience, FIGS. 1 and 2 selectively illustrate an exposed display window of the LCD unit 104 and an exposed part of the hinge device 112. The flip 102 has necks 108 extending to either end of the hinge device 112, and the hinge knuckles 110 are formed at ends of the respective necks 108. In the illustrated structure, the flip 102 rotates around an axis A1 represented by a dot-and-dash line, to be opened and closed with respect to the body 100.

Further, an antenna device 106 is placed at one side of the upper end of the body 100, and the LCD unit 104 is located below under the antenna device 106. Moreover, buttons 114 and a keypad 116 are located below the LCD unit 104. A reed switch 120 is built in a specific portion of the front side of the body 100 such that the reed switch 120 is covered when flip 102 is closed. A magnet 122 is built in an inner side of the flip 102 so that the magnet 122 may face the reed switch 120 when the flip 102 is closed. The reed switch 120 and the magnet 122 constitute a flip-open sensor for sensing an open state of the flip 102.

Figure 3:
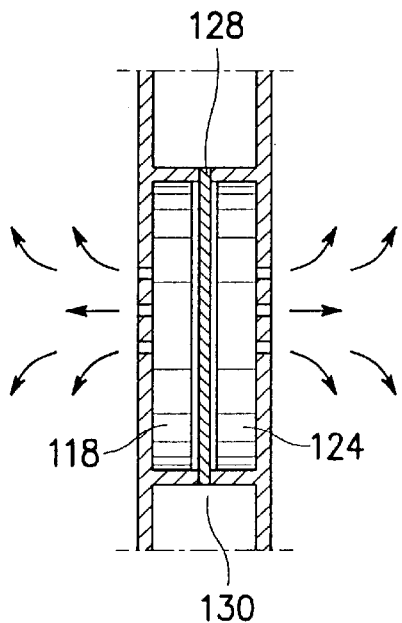
FIG. 3 is a diagram illustrating a structure of a speaker unit according to an embodiment of the present invention.

Referring to FIG. 3, unlike the conventional flip-up type mobile telephone terminal, the novel flip-up type mobile telephone terminal of the present invention further includes two separate speakers 118 and 124. As illustrated in FIG. 3, the first and second speakers 118 and 124 are assembled in a single speaker unit 130 and then installed in the flip 102. The speaker unit 130 is composed of a first speaker 118, a second speaker 124 and a partition 128. The first and second speakers 118 and 124 are installed at front and rear (i.e., outer and inner) sides of the flip 102, respectively, facing opposite directions, with the partition 128 intervening therebetween. It is preferable that the partition 128 is made of a material which prevents interference between the first and second speakers 118 and 124. By mounting two separate speakers on either side of the flip 102, the user can talk with the other party through the first speaker 118, in the situation where the flip 102 is closed.

In a conventional flip-up type mobile telephone terminal, a microphone device is typically installed in a front, lower portion of the body 100. With the conventional microphone placement, if the user uses the first speaker 118 positioned in accordance with the present invention (i.e., mounted on either side of the flip), when the flip 102 is closed, the distance between the first speaker 118 and the microphone device is relatively short, as compared with the case when the user uses the second speaker 124 when the flip 102 is open. Therefore, in order to prevent an influence between the first speaker 118 and the microphone device 126 when the flip is closed, the microphone device 126 is preferably installed in a bottom corner of the body 100. As is well known in the art, the distance between a transmitter including a microphone device and a receiver including a speaker device should be over 14 cm, in order to secure an ear-to-mouth distance of the user. In the light of the foregoing, the microphone device 126 is installed in the bottom corner of the body 100 so that the short distance between the first speaker 118 and the microphone device 126 may not influence the call (i.e., the conversation with the other party).

Figure 4:
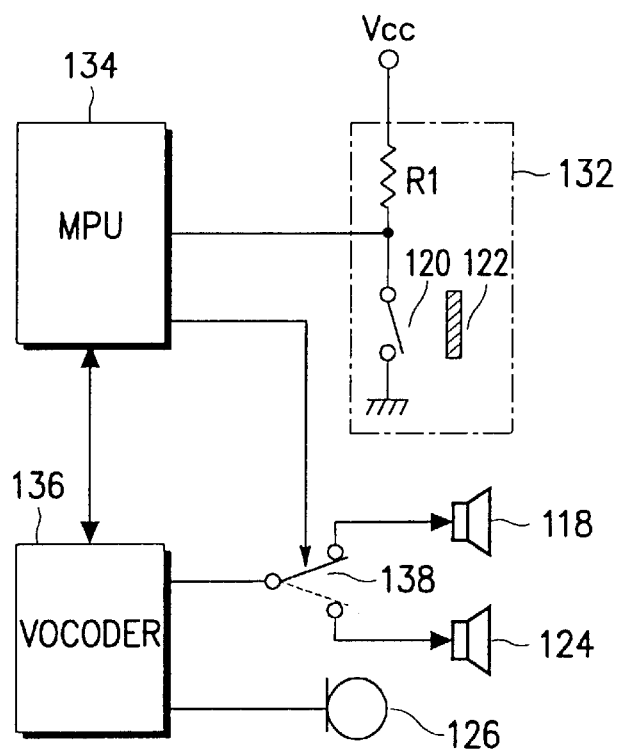
FIG. 4 is a diagram illustrating a device for switching a voice output path according to an embodiment of the present invention.

FIG. 4 illustrates a device for switching a voice output path according to an embodiment of the present invention. When the flip or folder is open with respect to the body, a flip-open sensor senses the open state of the flip, and a controller switches a voice output path to a second speaker when the flip is open, and to a first speaker when the flip is closed.

The switching device comprises a flip-open sensor 132 further comprising a reed switch 120, a magnet 122 and a resistor R1. As illustrated, the reed switch 120 and the resistor R1 are connected in series between a power supply voltage Vcc and ground. A connection node between the resistor R1 and the reed switch 120 is connected to an input node of a microprocessor unit (MPU) 134 of the mobile telephone terminal. As illustrated in FIG. 2, the reed switch 120 faces the magnet 122. Accordingly, when the flip 102 is open, the reed switch 120 is turned off, so that a logic "high" signal is applied to the MPU 134 via the input mode. Likewise, when the flip 102 is closed, the reed switch 120 is actuated, so that a logic "low" signal is applied to the MPU 134. As a result, the MPU 134 can monitor open and close states of the flip 102 through the flip-open sensor 132. The MPU 134 is so programmed as to control a switch 138 according to the open and close states of the flip 102. That is, the MPU 134 connects the switch 138 to the first speaker 118 when the flip 102 is closed, and to the second speaker 124 when the flip 102 is open. Here, the switch 138, having a common node connected to an output node of a vocoder 136 of the telephone terminal, a first contact node connected to the first speaker 118 and a second contact node connected to the second speaker 124, switches a voice output path to a selected one of the first and second speakers 118 and 124 under the control of the MPU 134. As usual, the vocoder 136 encodes a voice signal input from the microphone device 126 to provide encoded voice data to the MPU 134, and decodes voice data input from the MPU 134 to provide a decoded voice signal to the voice output node thereof.

As a result, when the flip 102 is closed, the voice output path is switched to the first speaker 118 so that the user can talk with the other party using the first speaker 118. Therefore, upon receipt of an incoming call, the user can answer the incoming call, without opening the flip 102, by simply pressing one (e.g., a SEND button) of the buttons 114. Alternatively, when the flip 102 is open, the voice output path is switched to the second speaker 124 so that the user can ordinarily talk with the other party using the second speaker 124. Similarly, the invention can be also applied to a folder type mobile telephone terminal, such as the one illustrated in FIG. 5.

Figure 5:
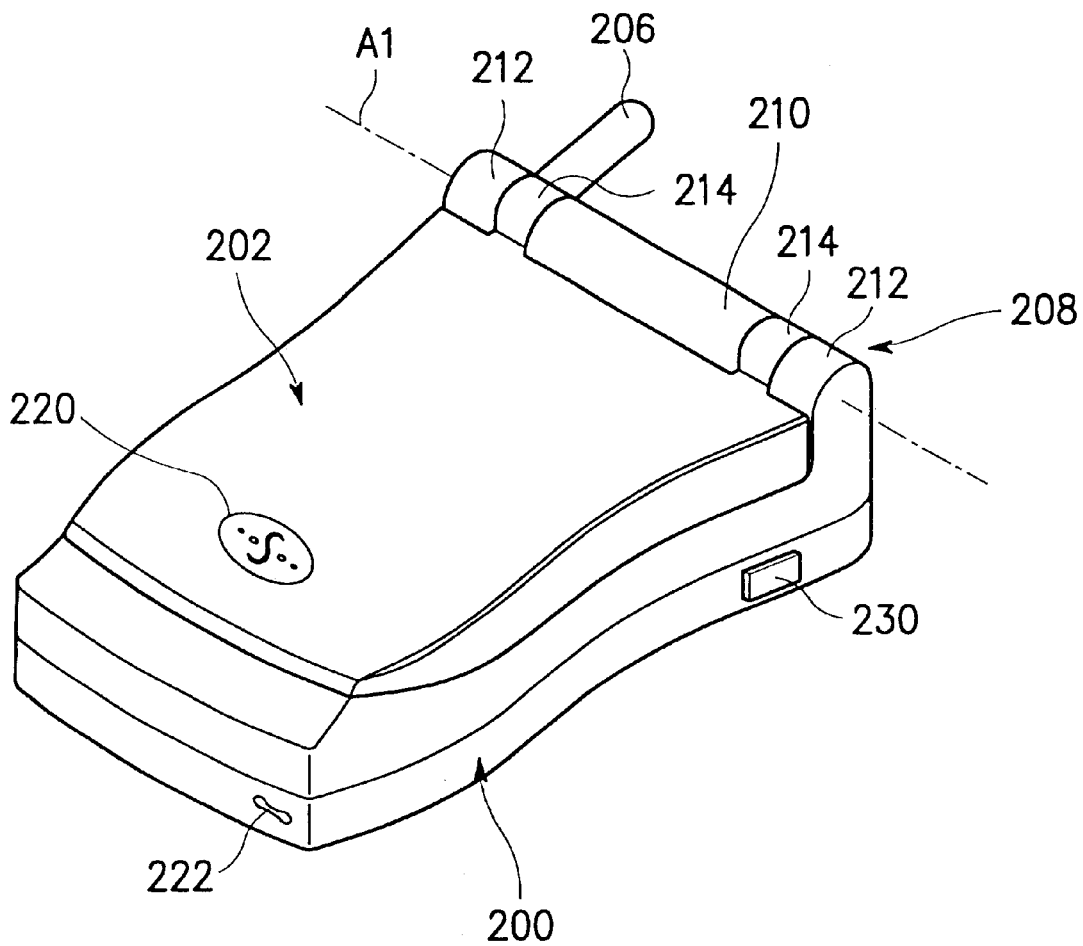
FIG. 5 is a perspective view of a folder type mobile telephone terminal with a folder closed, according to an embodiment of the present invention.
Figure 6:
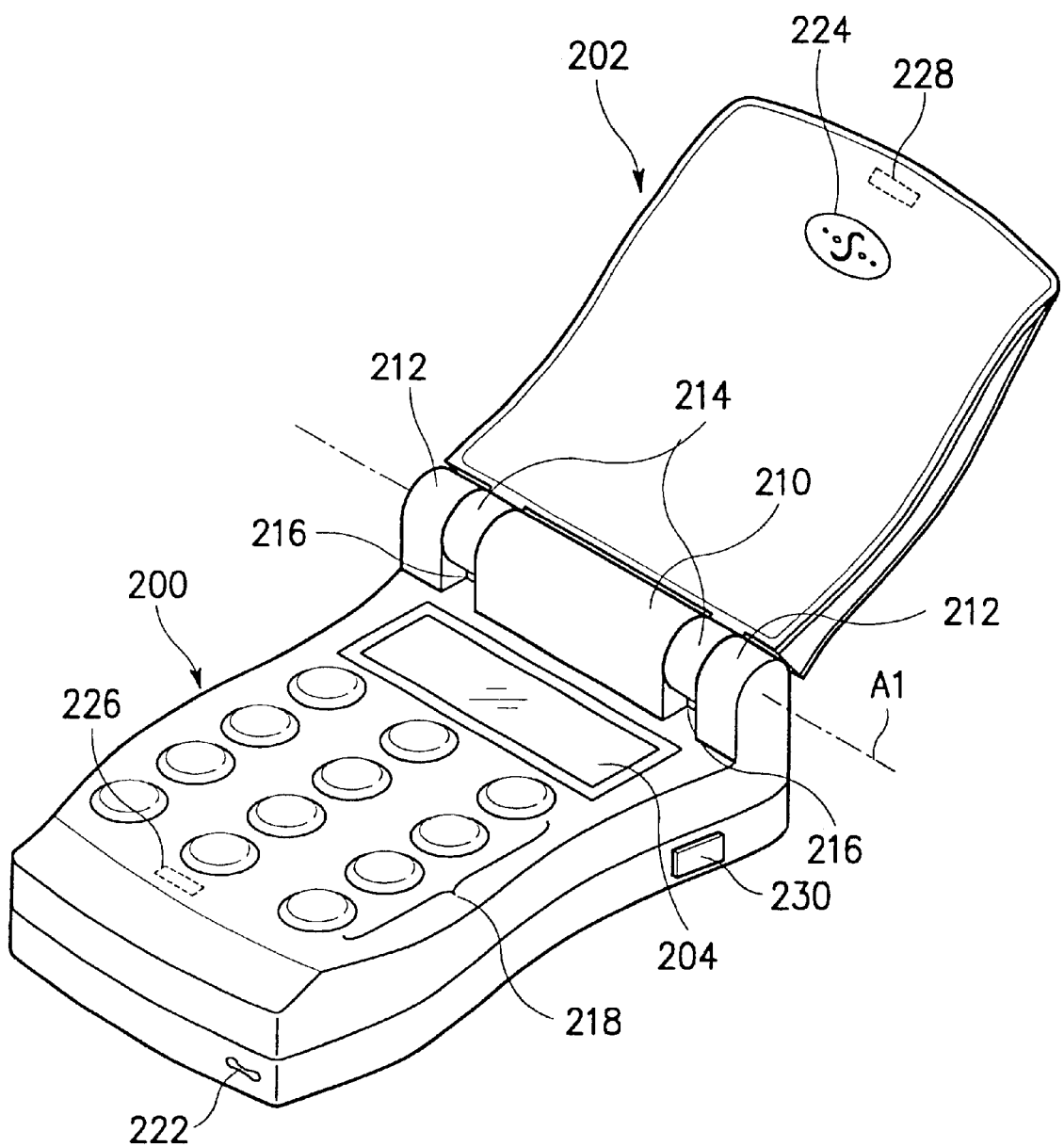
FIG. 6 is a perspective view of the folder type mobile telephone terminal with the folder opened.

FIG. 5 illustrates a folder type mobile telephone terminal with a folder closed, according to an embodiment of the present invention, and FIG. 6 illustrates the folder type mobile telephone terminal with the folder opened. The folder type mobile telephone terminal includes a body 200, a folder 202, and a hinge device 208 for mechanically coupling the folder 202 to the body 200. The hinge device 208 is formed at an upper end of the body 200. Hinge knuckles 214 are symmetrically formed at both ends of the hinge device 208, facing each other, along an upper end of the folder 202 hinged to the body 200. The hinge knuckles 214 are secured to the hinge device 208 through slots 216. In this structure, the folder 202 rotates around an axis A1 represented by a dot-and-dash line, thus to be opened and closed with respect to the body 200.

Further, an antenna device 206 is placed at one side of the upper end of the body 200. A center arm 210 is formed along the upper end of the body 200, and two side arms 212 are formed at either side of the center arm 210. The slots 216 are prepared between the center arm 210 and the side arms 212. An LCD unit 204 is located beneath the antenna device 206. Moreover, a keypad 218 is placed under the LCD unit 204. A reed switch 226 is built in a specific portion of the front side of the body 200 such that the reed switch 226 is covered when folder 202 is closed. A magnet 228 is built in an inner side of folder 202 so that the magnet 228 may face the reed switch 226 when the folder 202 is closed. The reed switch 226 and the magnet 228 constitute a folder-open sensor for sensing an open state of the folder 202. Here, for convenience, FIGS. 4 and 5 selectively illustrate an exposed display window of the LCD unit 104 and an exposed part of the hinge device 208.

Figure 2:
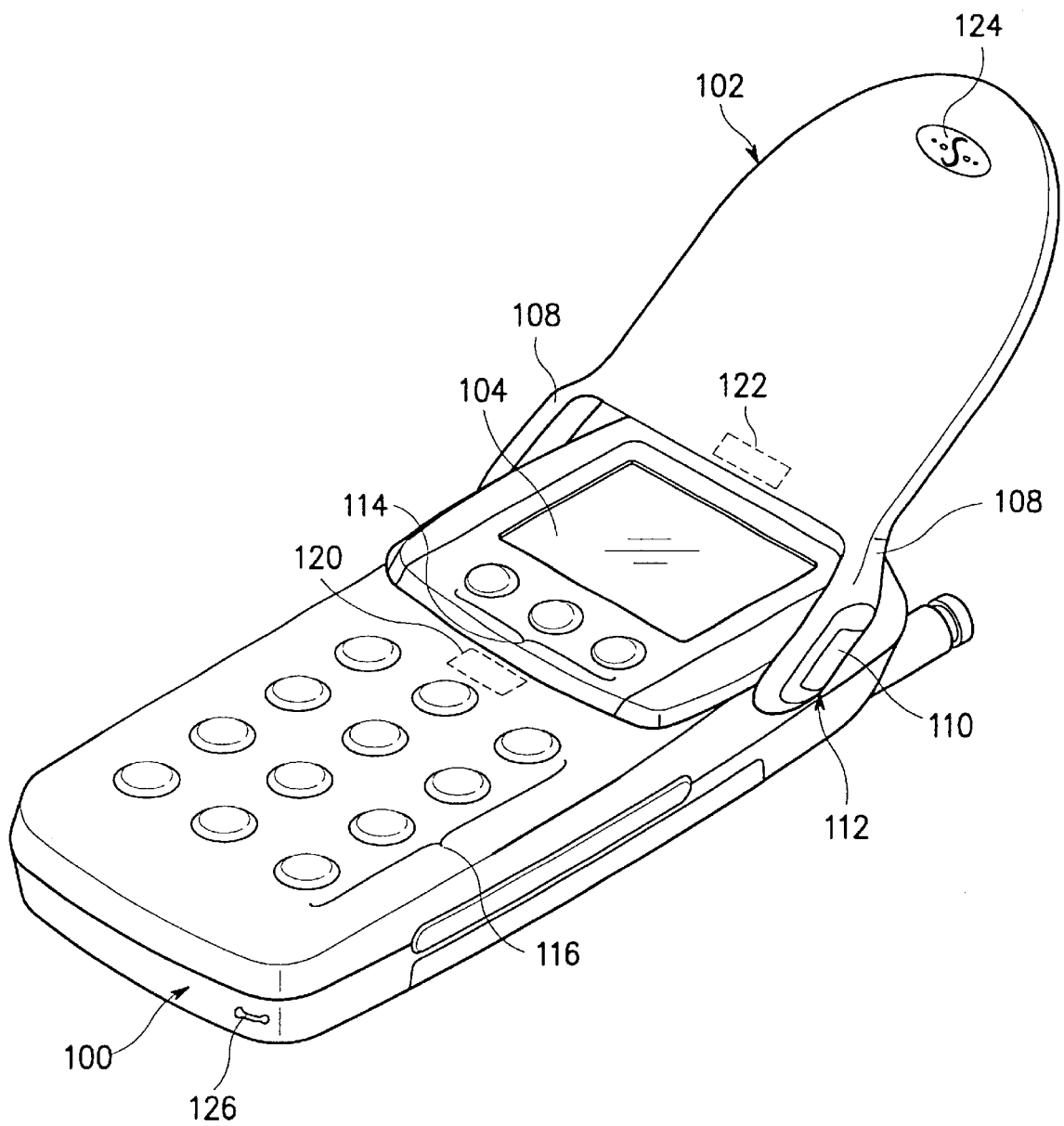
FIG. 2 is a perspective view of the flip-up type mobile telephone with the flip opened according to an embodiment of the present invention.

Like the flip-up type mobile telephone terminal shown in FIGS. 1 and 2, the novel folder type mobile telephone terminal also includes two separate speakers 220 and 224. In the same manner, the first and second speakers 220 and 224 assembled in the single speaker unit and installed at front and rear (or outer and inner) sides of the folder 202, respectively, facing the opposite directions, with the partition intervening therebetween. Accordingly, the user can talk with the other party through the first speaker 220 when the folder 202 is closed. In addition, a microphone device 222 is installed in a bottom corner of the body 200, in the same manner as shown in FIGS. 1 and 2.

Fundamentally, the folder type mobile telephone terminal of FIGS. 5 and 6 operates in the same manner as the flip-up type mobile telephone terminal of FIGS. 1 and 2. Therefore, a circuit for switching the voice output path to the first or second speaker 220 or 224 according to open and close states of the folder 202 has the same structure as that of FIG. 4.

As a result, when the folder 202 is closed, the voice output path is switched to the first speaker 220 so that the user can talk with the other party using the first speaker 220. Therefore, upon receipt of an incoming call, the user can answer the incoming call, even without opening the folder 202, by simply pressing a button 230 mounted on a side of the body 200. Alternatively, when the folder 202 is open, the voice output path is switched to the second speaker 224 so that the user can ordinarily talk with the other party using the second speaker 224.

As described above, the flip-up type or folder type mobile telephone terminal has a speaker unit including first and second speakers facing front and rear sides of a flip or folder, and switches a voice output path to the first or second speaker according to open and close states of the flip or the folder. Therefore, the user can communicate with the other party, without opening the flip or the folder.

Figure 7:
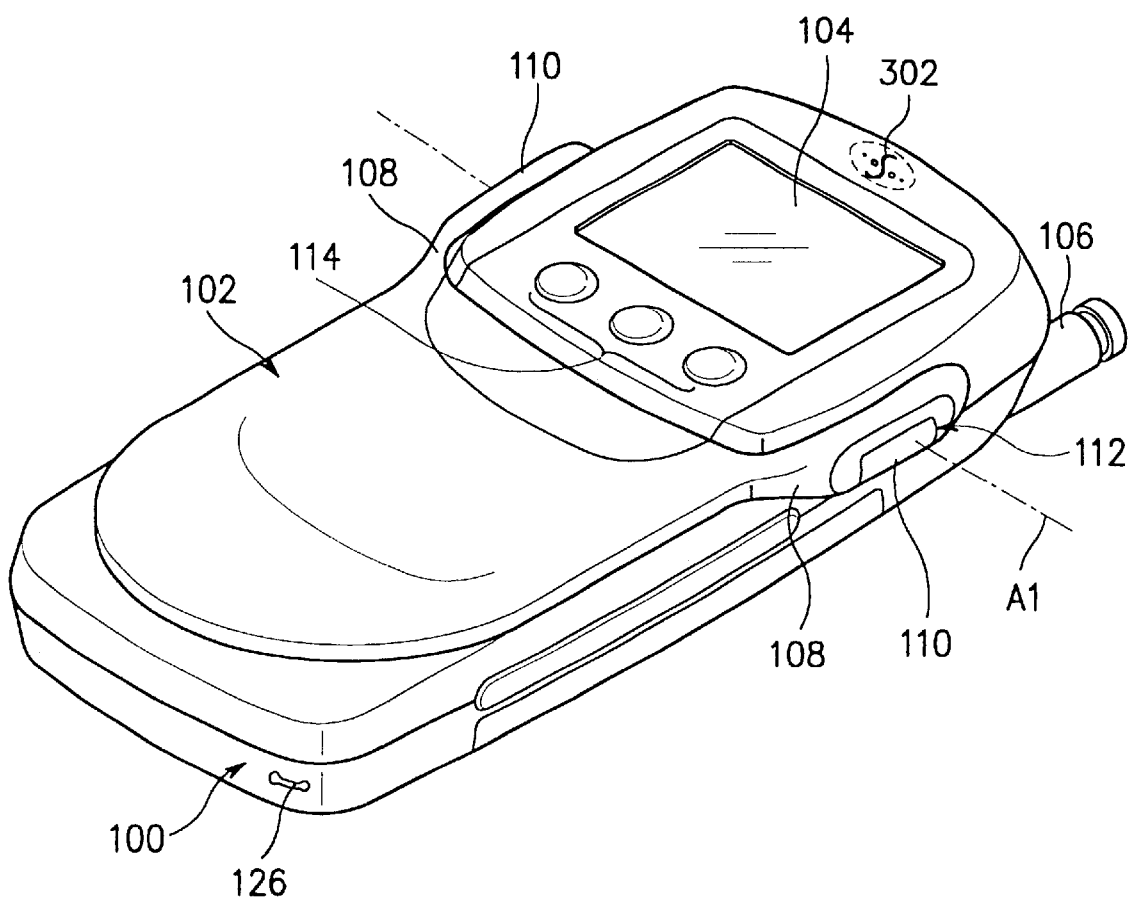
FIG. 7 is a perspective view of a flip-up type mobile telephone terminal with a flip closed, according to another embodiment of the present invention.
Figure 8:
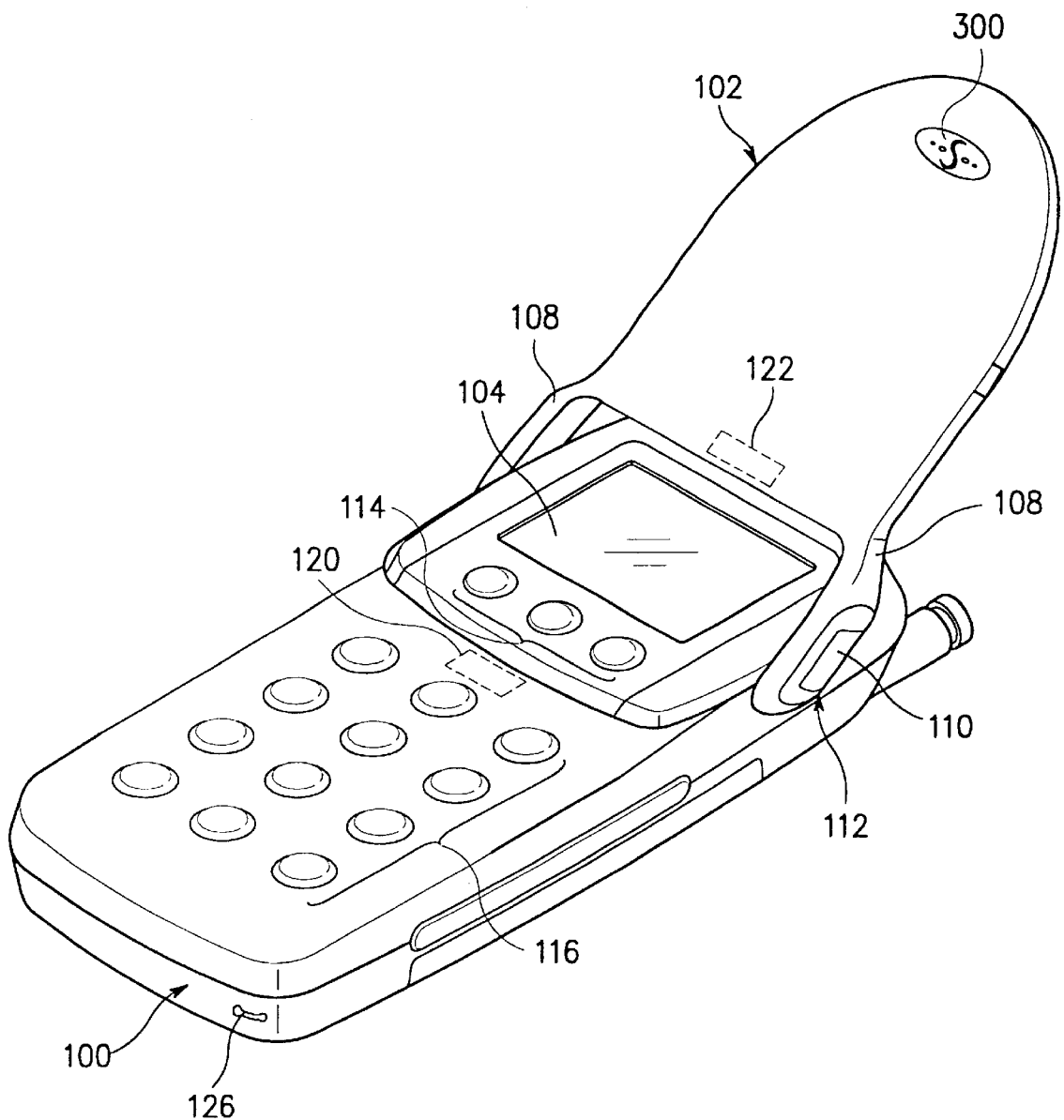
FIG. 8 is a perspective view of the flip-up type mobile telephone of FIG. 7 with the flip opened.

FIG. 7 illustrates a flip-up type mobile telephone terminal according to another embodiment of the present invention, a flip of which is closed. FIG. 8 illustrates the flip-up type mobile telephone terminal, the flip of which is open.

Unlike the flip-type mobile telephone terminal as illustrated in FIGS. 1 and 2, the flip-up type mobile telephone terminal of FIGS. 7 and 8 includes two separate speaker devices 300 and 302 (see FIG. 7). The first speaker device 300 is installed in an inner side of the flip 102 in the same manner as the conventional speaker device. However, the second speaker device 302 is installed in a front, upper portion of the body 100 such that the second speaker device 302 is not covered by the flip 102 when the flip 102 is closed. By adding the second speaker device 302, the user can speak with the other party through the second speaker device 302 with the flip 102 closed.

Fundamentally, the flip-up type mobile telephone terminal of FIGS. 7 and 8 operate in the same manner as the flip-up type mobile telephone terminal of FIGS. 1 and 2. Therefore, a circuit for switching the voice output path to the first or second speaker 300 or 302 according to the open and closed states of the flip 102 has the same structure as that of FIG. 4.

Figure 9:
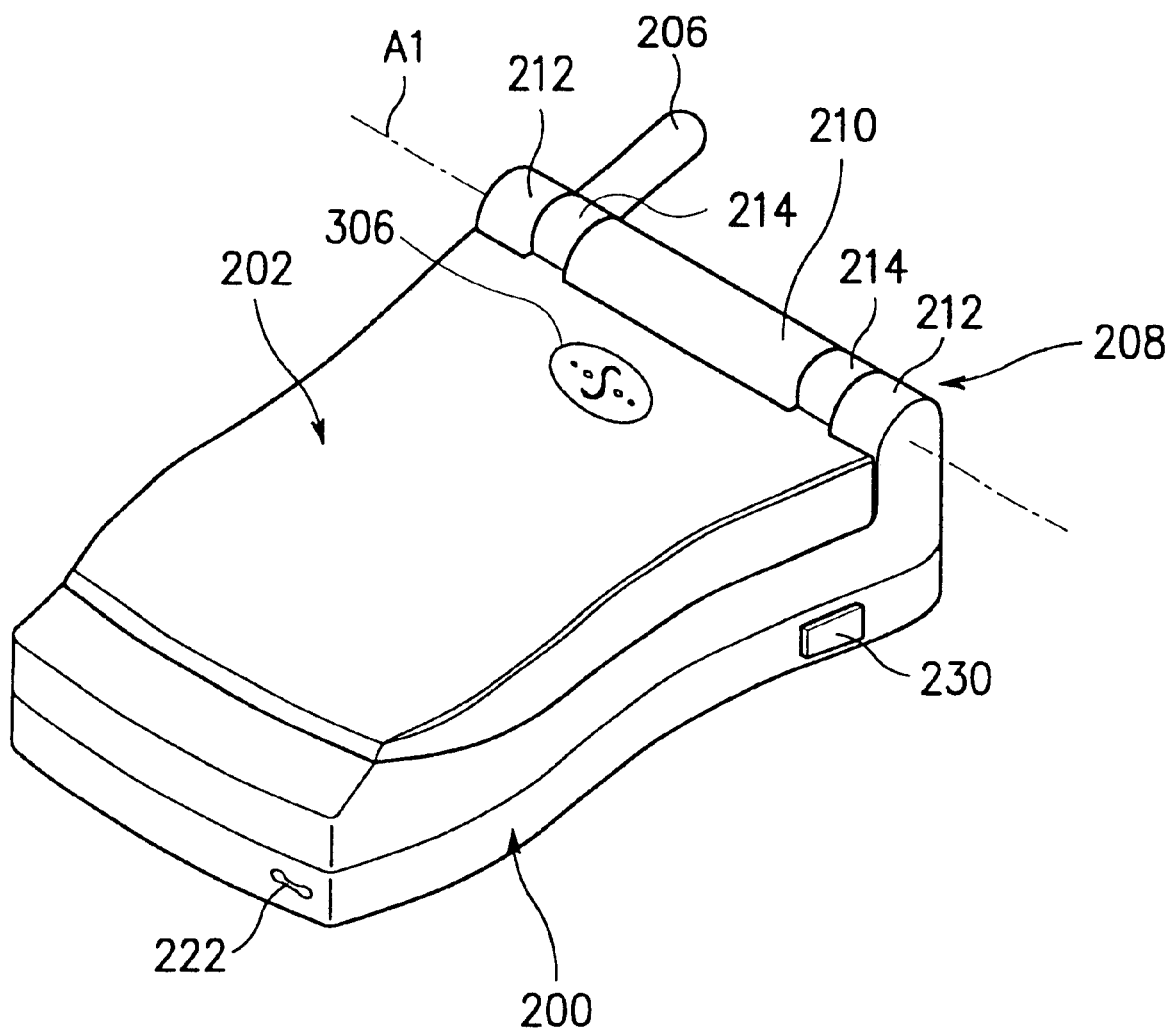
FIG. 9 is a perspective view of a folder type mobile telephone terminal with a folder closed, according to another embodiment of the present invention.
Figure 10:
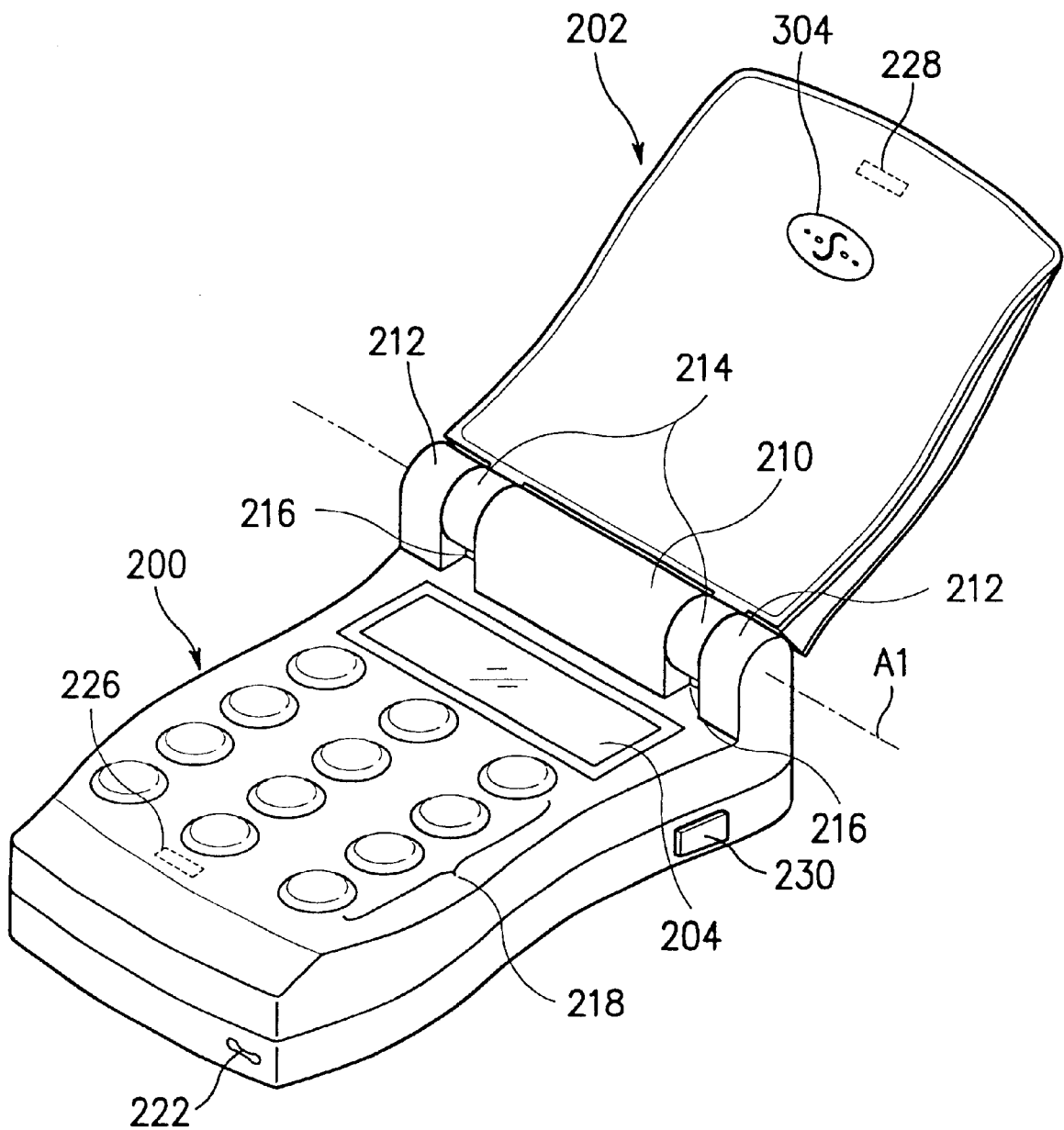
FIG. 10 is a perspective view of the folder type mobile telephone of FIG. 9 terminal with the folder opened.

FIG. 9 illustrates a folder type mobile telephone terminal with a folder closed, according to another embodiment of the present invention and FIG. 10 illustrates the folder type mobile telephone terminal with the folder opened.

Like the flip-up type mobile telephone terminal shown in FIGS. 7 and 8, the novel folder type mobile telephone terminal also includes two separate speaker devices 304 (see FIG. 10) and 306 (see FIG. 9). The first speaker device 304 is mounted on an inner side of the folder 202, in the same manner as the conventional speaker device. However, the second speaker device 306 is mounted on an outer, upper portion of the folder 202. By adding the second speaker device 306, the user can speak with the other party through the second speaker device 306 when the folder 202 is closed.

Fundamentally, the folder type mobile telephone terminal of FIGS. 9 and 10 operates in the same way as the flip-up type mobile telephone terminal of FIGS. 1 and 2. Therefore, a circuit for switching the voice output path to the first or second speaker device 304 or 306 according to open and closed states of the folder 202 has the same structure as that of FIG. 4.

As described above, the flip-up type or folder type mobile telephone terminal has first and second speaker devices disposed at different places such that the first speaker device is used when the flip or the folder is opened and the second speaker device is used when the flip or the folder is closed. Further, the mobile telephone terminal switches a voice output path to one of the first and second speaker devices according to open and closed state of flip or the folder. Therefore, the user can speak with the other party, without opening the flip or the folder.

While the invention has been shown and described with reference to a certain preferred embodiment thereof, it will be understood by those skilled in the art that various changes in form and details may be made therein without departing from the spirit and scope of the invention as defined by the appended claims. For example, the microphone device can be prepared at the center of the bottom of the body. Further, in case that a short distance between the microphone device and the speaker device does not influence the call, the microphone device can be installed in the front, lower end of the body.

What is claimed is:

1. A flip-up type mobile telephone terminal comprising:

a speaker unit, for outputting voice signals during a telephone operation mode, including first and second speakers installed at respective front and rear sides of a flip of the telephone terminal, facing opposite directions, said speaker unit further having a partition disposed between the first and second speakers to prevent interference therebetween;

a flip-open sensor for sensing an open state of the flip; and a controller for detecting the open state of the flip through the flip-open sensor, and switching a voice output path to the first speaker when the flip is closed and to the second speaker when the flip is open, during said telephone operation mode.

2. The flip-up type mobile telephone terminal as claimed in claim 1, further comprising a microphone device installed in a bottom of the body of the telephone terminal.

3. The flip-up type mobile telephone terminal as claimed in claim 1, wherein said microphone device is disposed a distance at least 14.5 cm from said first and second speakers to secure an ear to mouth distance of the user.

4. A folder type mobile telephone terminal comprising:

a speaker unit, for outputting voice signals during a telephone operation mode, including first and second speakers installed at front and rear sides of a folder of the telephone terminal, respectively, facing opposite directions, said speaker unit having a partition intervening between the first and second speakers to prevent interference therebetween;

a folder-open sensor for sensing an open state of the folder; and a controller for detecting the open state of the folder through the folder-open sensor, and switching a voice output path to the first speaker when the folder is closed and to the second speaker when the folder is open, during said telephone operation mode.

5. The folder type mobile telephone terminal as claimed in claim 4, further comprising a microphone device installed in a bottom of the body of the telephone terminal.

6. A folder type mobile telephone terminal comprising:

a first speaker device, for outputting voice signals during a telephone operation mode, installed in an inner side of a folder of the telephone terminal;

a second speaker device, for outputting voice signals during a telephone operation mode, installed in an outer, upper portion of the folder;

a folder-open sensor for sensing an open state of the folder; and a controller for detecting the open state of the folder through the folder-open sensor, and switching a voice output path to the second speaker device when the folder is closed and to the first speaker device when the folder is open, during said telephone operation mode.

7. The folder type mobile telephone terminal as claimed in claim 6, further comprising a microphone device installed in a bottom of the body of the telephone terminal.

* * * * *